(12) United States Patent
McBurney et al.

(10) Patent No.: US 6,674,401 B2
(45) Date of Patent: Jan. 6, 2004

(54) HIGH SENSITIVITY GPS RECEIVER AND RECEPTION

(75) Inventors: Paul W. McBurney, San Francisco, CA (US); Arthur N. Woo, Cupertino, CA (US)

(73) Assignees: eRide, Inc., San Francisco, CA (US); Seiko Epson Corporation, Tokyo (JP)

( * ) Notice: Subject to any disclaimer, the term of this patent is extended or adjusted under 35 U.S.C. 154(b) by 136 days.

(21) Appl. No.: 10/079,245

(22) Filed: Feb. 19, 2002

(65) Prior Publication Data

US 2003/0156059 A1 Aug. 21, 2003

(51) Int. Cl.[7] .................................. G01S 5/14
(52) U.S. Cl. .................................. 342/357.12
(58) Field of Search ................. 342/357.12, 357.06

(56) References Cited

U.S. PATENT DOCUMENTS 4,426,712 A * 1/1984 Gorski-Popiel ............. 375/343
4,893,316 A * 1/1990 Janc et al. .................. 708/300
5,379,224 A * 1/1995 Brown et al. ............... 701/215
5,768,319 A * 6/1998 Durboraw, III ............. 375/316

OTHER PUBLICATIONS

Frank, G.B. et al, "Collins Next Generation Digital GPS Receiver" IEEE Plans 1990, Mar. 1990, pp. 286–292.*

Holm et al, " A GPS Fast Acquisition Receiver" IEEE 1983 National Telesystems Conference, pp. 214–218.*

* cited by examiner

Primary Examiner—Gregory C. Issing

(57) ABSTRACT

A navigation receiver comprises a digital sampler that precedes digital signal processing which can operate at a high rate and a low rate. If the high rate is selected for noise reduction by non-coherent averaging, the samples are averaged over time and transformed to the low rate. The digital signal processor is fed only low-rate samples in either case.

10 Claims, 2 Drawing Sheets

HIGH SENSITIVITY GPS RECEIVER AND RECEPTION

RELATED PATENT APPLICATION

Figure 1:
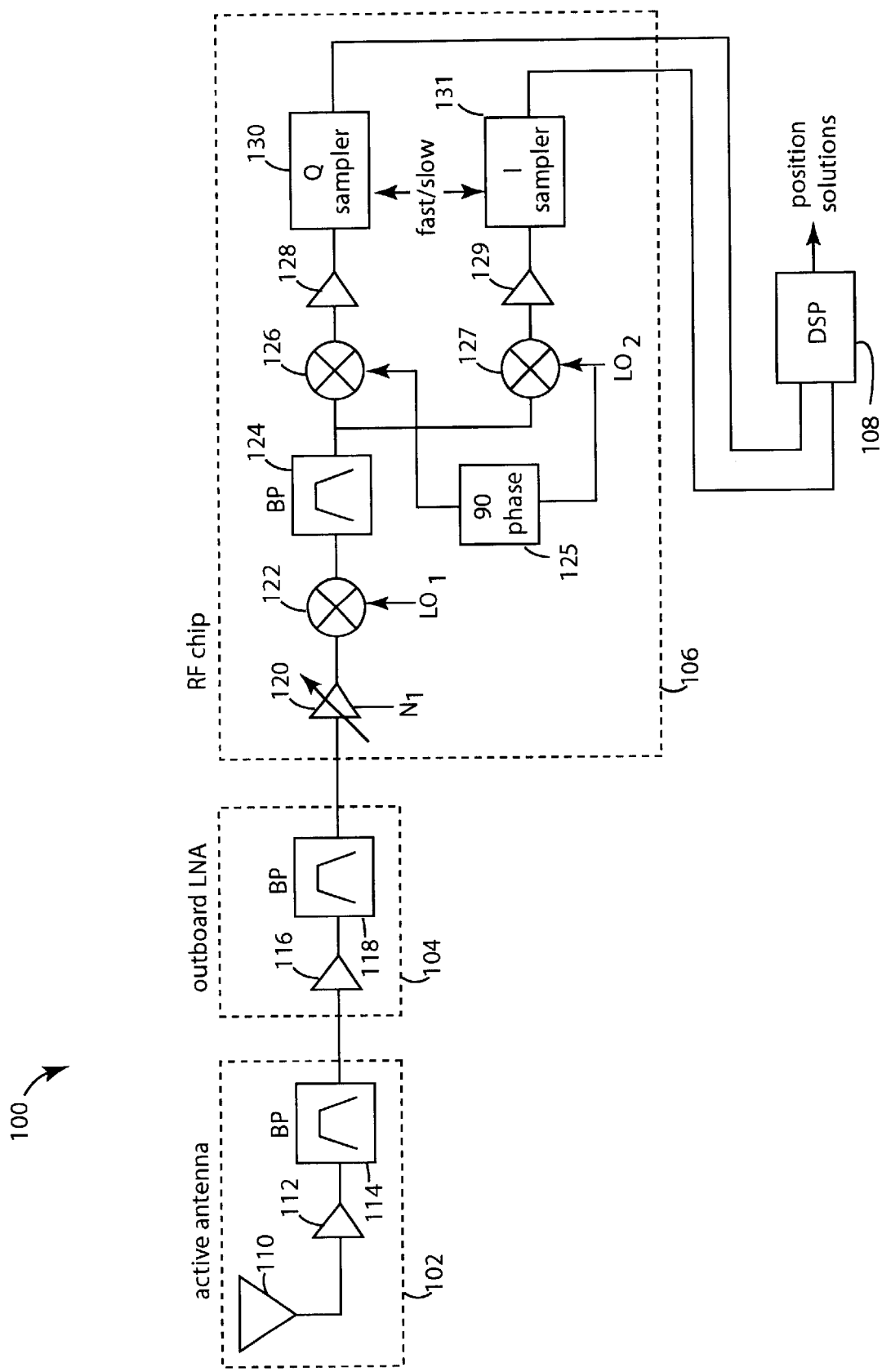

U.S. patent application Ser. No. 09/687,044, filed Oct. 11, 2000, now U.S. Pat. No. 6,437,734 and titled SATELLITE NAVIGATION RECEIVER AND METHOD is incorporated herein by reference.

FIELD OF THE INVENTION

The present invention relates to satellite-navigation receivers and systems, and more particularly to improvements to the radio sensitivity of GPS receivers that help continue to provide position solutions in indoor and other covered locations.

DESCRIPTION OF THE PRIOR ART

Global positioning system (GPS) receivers use signals received from typically three or more earth-orbiting satellites to determine navigational data such as position and velocity. GPS signals are available worldwide at no cost and are now being routinely used to determine the location of automobiles to within one city block, or better. Dual-frequency carrier GPS receivers typically track a pair of radio carriers, L1 and L2, associated with the GPS satellites to generate accumulated delta-range measurements (ADR) from P-code modulation on those carrier frequencies and at the same time track L1 C/A-code to generate code phase measurements. Carrier frequency L1 is allocated to 1575.42 MHz and carrier frequency L2 is positioned at 1227.78 MHz. Less expensive receivers tune only one carrier frequency, and therefore do not have adequate information to compute the local troposheric and ionospheric signal-propagation delays that appear as position errors. At such frequencies, radio carrier signals travel by line-of-sight. Thus buildings, mountains and the horizon can block reception, and multipath reflections can interfere with good reception.

Each one of the constellation of GPS satellites in orbit about the earth transmits one of thirty-two unique identifying codes in a code-division multiple access (CDMA) arrangement. Such allows all of the many GPS satellites to transmit in spread spectrum mode at the same frequency, plus or minus a Doppler frequency shift of that frequency as results from the satellite's relative velocity. Particular satellites are sorted out of a resulting jumble of signals and noise by correlating a 1023 "chip" code to one of the thirty-two pseudo random number (PRN) sequence codes that are preassigned to individual GPS satellites. These codes are not necessarily being transmitted in phase with one another. Therefore, "finding" a GPS satellite initially involves searching various carrier frequencies, to account for Doppler frequency shift and local crystal oscillator inaccuracies. The searching also needs to find a code match, using 1023 different code phases and twenty or more possible correlation code templates.

The single largest uncertainty stems from the random frequencies possible from typical local oscillators at start-up. Therefore, the apparent-Doppler frequency is known only within wide search boundaries. Knowing the actual Doppler frequency is not much help, because the local oscillator can be so far off nominal on its own.

From the user's standpoint, at least two operational characteristics of prior art GPS receivers interfere with complete satisfaction. Such conventional receivers often quit working indoors because the buildings reduce the local signal field level to less than the receiver's maximum sensitivity. And, most receivers take a very long time to produce a position solution from a cold start.

Indoors, the signal-to-noise ratio (SNR) typically drops too low to provide a useful signal for conventional GPS receivers. The available signal gets buried in the noise. In general, two methods can be used to improve a receiver's SNR, coherent sample averaging and non-coherent sample averaging. In the coherent method, the analog-to-digital samples are summed before squaring, e.g., $$\sum_{}^{m} P,$$

where $$P = \left(\sum_{}^{n} I\right)^2 + \left(\sum_{}^{n} Q\right)^2$$

and I and Q are summed over ten milliseconds. In the non-coherent method, the samples are summed after squaring.

The objective in such averaging is to reduce the statistical variance. Since the SNR is defined as $$10 \log \frac{A^2}{2\sigma^2},$$

reducing σ, the variance of uncorrelated noise, will improve the SNR and therefore the receiver sensitivity. In the coherent averaging method, the improvement is 10 log N, where N is the number of milliseconds being summed up. In the non-coherent averaging method, the improvement is 10 log √M, where M is the number of milliseconds being summed up. Together, the overall improvement in a prior art receiver could be 10 log N+10 log√M. But too large an N can increase integration times and narrow the frequency response. The narrower the frequency response is, the longer it will take for the receiver to find initial lock with the carrier because finer steps must be taken in the search. So the gains in receiver sensitivity can come at the sacrifice of reasonable time-to-first-position-fix performance.

SUMMARY OF THE INVENTION

It is therefore an object of the present invention to provide a satellite-navigation receiver that can work indoors with extremely low signal-strength levels.

It is another object of the present invention to provide a satellite-navigation receiver that produces position solutions rapidly after each cold start.

It is a further object of the present invention to provide a satellite-navigation system that is inexpensive.

Briefly, a receiver embodiment of the present invention comprises a digital sampler that precedes digital signal processing which can operate at a high rate and a low rate. If the high rate is selected for noise reduction by non-coherent averaging, the samples are averaged over time and transformed to the low rate. The digital signal processor is fed only low-rate samples in either case.

An advantage of the present invention is that a system and method are provided that substantially increase the sensitivity of navigation receivers.

Another advantage of the present invention is that a system and method are provided that improve sensitivity and time-to-first-fix enough for urban canyon and indoor use.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
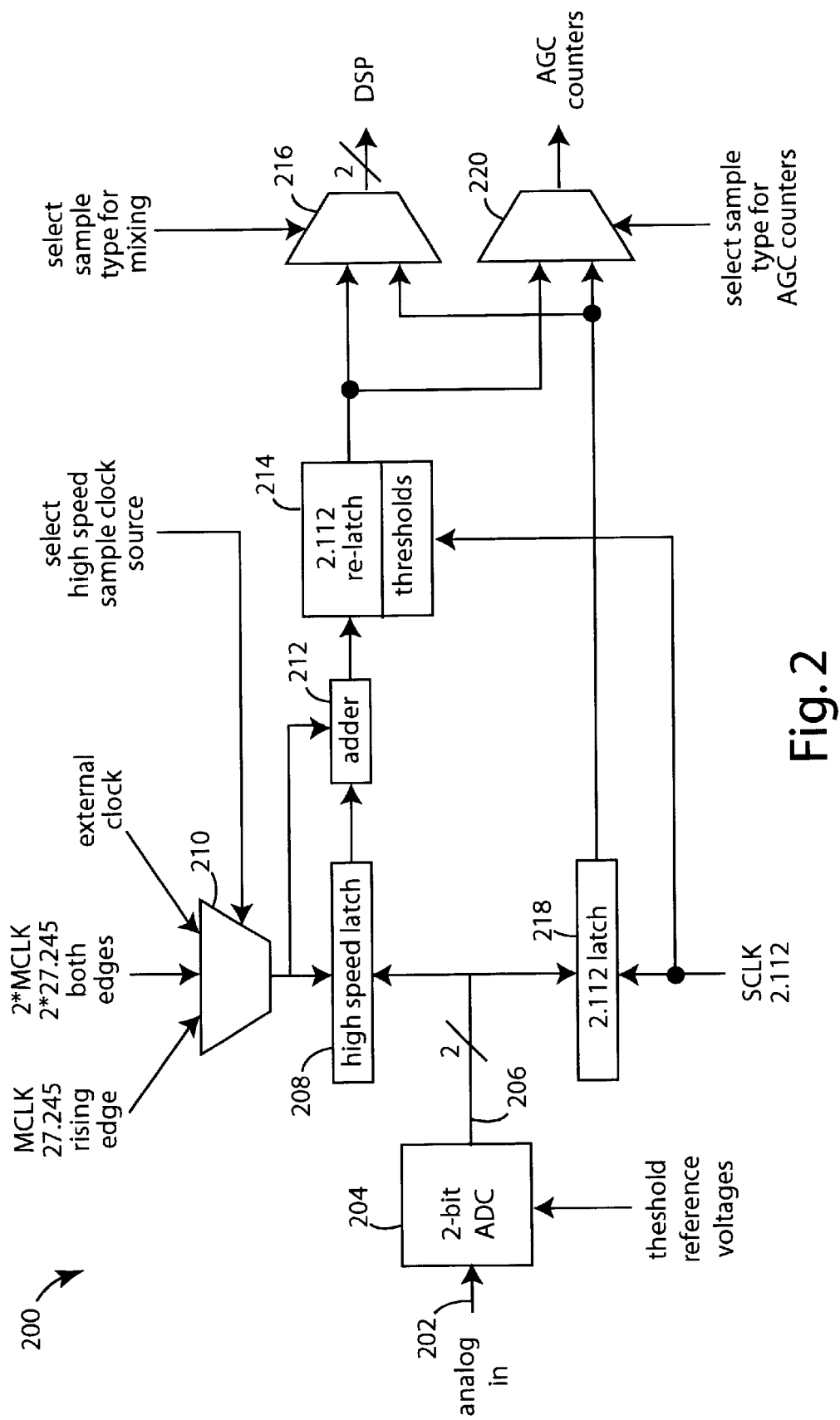

FIG. 1 is a functional block diagram of a receiver embodiment of the present invention; and FIG. 2 is a functional block diagram of a sampler used in each of the I and Q channels of the receiver in FIG. 1.

DETAILED DESCRIPTION OF THE PREFERRED EMBODIMENT

FIG. 1 illustrates a receiver 100, in an embodiment of the present invention, that includes an active antenna 102, an outboard low-noise amplifier (LNA) 104, a radio frequency (RF) chip 106, and a digital signal processor (DSP) 108 that provides position-fix outputs. A typical receiver 100 operates with the L-band microwave signals transmitted by orbiting global positioning system (GPS) navigation satellites. The active antenna 102 includes a broadband antenna 110, a low-noise amplifier (LNA) 112, and a first RF bandpass filter 114. The outboard LNA 104 includes an amplifier 116 followed by a second RF bandpass filter 118. The RF chip 106 has an AGC-controlled amplifier 120, a first mixer 122 which is fed a first local oscillator (LO1), and an intermediate frequency (IF) bandpass filter 124 for image rejection. The in-phase (I) and quadrature-phase (Q) samples are obtained by a 90° phase shifter 125 that provides a quadrature phase second local oscillator (LO2) signal to a Q-mixer 126. An I-mixer 127 is fed by the in-phase LO2 signal.

The DSP 108 preferably comprises a conventional GPS-receiver type with a traditional sampling rate, e.g., "$F_{LS}$" for low-speed sampling. The IF bandpass filter is typically centered at 175-MHz, and the second-IF mixers 126 and 127 convert to baseband, e.g., 132-KHz.

Just after the I and Q mixers, a pair of amplifiers 128 and 129 build up the signal levels. A pair of low-pass, anti-aliasing filters may be included after these amplifiers, as is done in conventional receiver design. But if included, such low-pass filters should have knees at 20-MHz or higher, but low enough for image rejection.

A Q-sampler 130 and an I-sampler 131 both include hard-limiters and comparators that convert the analog signals to two-bit digital. Such bits are the sign and magnitude, and can be labeled with weights "3", "1", "–1", and "–3" for convenience. Internally, these samplers 130 and 131 can sample at more than one rate, e.g., a high rate used to average-out noise and a standard low rate. But the output rate of samples is fixed at a relatively low, standard-rate for compatibility with the DSP 108.

The best possible receiver signal-to-noise ratio (SNR) is mainly predetermined by the initial signal level and noise level that appear at the input to LNA 112. In a typical GPS receiver, the signal bandwidth at this point will be about one MHz for coarse acquisition (C/A) code at the L1-carrier frequency, and the noise bandwidth will be twenty MHz or more. In embodiments of the present invention, the ratio of these noise-to-signal bandwidths determines how much the SNR can be improved over conventional receivers using the methods and circuits disclosed herein.

Truly white, non-coherent noise can be averaged out over time to practically zero. If the bandpass filters remove too much noise, the filtered noise will not average out to a true null in later stages. Since the signal is deeply buried in all the thermal and other background noise, even small residual amounts of noise after averaging can obscure the sought-for signal energy.

So it is advantageous to have the bandpass of the first and second RF bandpass filters 114 and 118 open to 20-MHz around the L1-carrier, and to have bandpass filter 124 also open to 20-MHz around the first intermediate frequency. Sampling at a higher than normal rate will be used here, but if the noise were correlated then averaging would produce the average of the noise and not of the signal. Therefore, as a rule of thumb the bandwidth of the noise must be "P" times the bandwidth of the signal. A minimum "P" value of twenty has produced good results in experiments.

FIG. 2 details a preferred embodiment of the I and Q samplers 130 and 131 shown in FIG. 1. A sampler 200 receives either I or Q analog information from an input 202. A 2-bit analog-to-digital converter (ADC) 204 provides a sign bit and a magnitude bit. Internally, the ADC 204 has three op-amp comparators that depend on a reference voltage input. Such dependence can cause DC-offsets which degrade the signal. A 2-bit digital value 206 is latched-in by a high-speed latch 208 according to which clock source has been chosen by a latch-clock data selector 210. For example, a memory clock (MCLK) at 27.245-MHz, a double-MCLK at 54.49-MHz, or an external clock can be selected. An adder 212 is used to accumulate the high-speed samples for averaging, e.g., by dropping some of the least significant bits output by the adder. A 2.112-MHz re-latch 214 includes digital thresholds that can be added or subtracted from the sample averages, e.g., to reduce or zero out DC-offsets that were introduced by slight inaccuracies in the operation of ADC 204. A sample-type data selector 216 enables averaged high-speed samples from the 2.112-MHz re-latch 214 to be output or non-averaged low-speed samples from a 2.112-MHz latch 218. Its output provides samples at conventional rates to a DSP, e.g., DSP 108 (FIG. 1). An automatic gain control (AGC) data selector 220 allows the two sample types to be selected for the AGC counters.

In general, navigation receiver embodiments of the present invention have a first radio-frequency bandwidth filter with a passband of at least twenty times the bandwidth of an expected signal, so sample averaging is improved. A high-rate sampler is included for taking high-rate samples of the signal and noise that pass through the first radio-frequency bandwidth filter. Then a summer is used for summing up high-rate samples and providing sample averages. Lastly, a converter is used to transform the sample averages into a traditional low-rate sample for conventional digital processing.

A high-speed sampling of the received signal-plus-noise is therefore used to average out the noise, e.g., "$F_{HS}$". Such samples are then transformed to low-rate samples for acceptance it and processing by the DSP. In effect, the DSP is spoofed by being fed samples with much of the noise already removed that were burying the signal. The low-rate samples are contrived to be at the sample rate expected by the DSP. Since the overall power consumption is strongly related to the sample rate of the DSP, running at lower sample rates will conserve power.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method for improving the sensitivity of a navigation receiver, the method comprising the steps of:

opening up the radio frequency (RF) and intermediate frequency (IF) passband of RF and IF receiver stages substantially wider than a desired-signal bandwidth;

sampling a desired signal after superheterodyne conversion at a first sample-rate;

averaging samples obtained in the step of sampling to zero-out noise and increase the signal-to-noise ratio of said desired signal; and outputting averaged samples obtained in the step of averaging at a second sample-rate substantially slower than said first sample-rate;

wherein a digital signal processor provides for position solutions from said averaged samples obtained at said second sample-rate.

2. The method of claim 1, wherein:

the step of opening up includes the use of L-band microwave signals transmitted from orbiting global positioning system (GPS) navigation satellites.

3. The method of claim 1, wherein:

the step of opening up includes the use of bandpass filters with passbands at least twenty times the bandwidth of said desired signal.

4. The method of claim 1, wherein:

the step of sampling is such that said first sample-rate is more than ten times higher than said second sample-rate.

5. A navigation receiver, comprising, a first radio-frequency bandwidth filter having a passband at least twenty times the bandwidth of an expected signal, wherein sample averaging is improved;

a high-rate sampler for taking high-rate samples of the signal and noise that pass through the first radio-frequency bandwidth filter;

a summer for summing up high-rate samples and providing for sample averages; and a converter for converting said sample averages to a low-rate sample.

6. The receiver of claim 5, wherein:

the first radio-frequency bandwidth filter has a passband centered on the L1-carrier of a microwave signal and is about 20-MHz wide.

7. The receiver of claim 5, wherein:

the high-rate sampler operates at least ten times the frequency of said low-rate samples output from the converter.

8. The receiver of claim 5, wherein:

the converter digitally removes a DC-offset that was injected in an earlier stage of the receiver and thus provides for further improved receiver sensitivity.

9. The receiver of claim 5, further comprising:

a selector for choosing between high-rate sampling and low-rate sampling.

10. The receiver of claim 9, further comprising:

a digital signal processor with a low-rate sample input that is connected to the converter such that it inputs samples at a constant rate independent of the state of the selector.

* * * * *